US011608177B2

(12) United States Patent
Interlandi (10) Patent No.: US 11,608,177 B2
(45) Date of Patent: Mar. 21, 2023

(54) AIRCRAFT PASSENGER SEAT ROW WITH CABIN ATTENDANT SEAT

(71) Applicant: B/E Aerospace, Inc., Winston-Salem, NC (US)

(72) Inventor: Michael Interlandi, Kernesville, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 162 days.

(21) Appl. No.: 17/128,367

(22) Filed: Dec. 21, 2020

(65) Prior Publication Data

US 2022/0194592 A1 Jun. 23, 2022

(51) Int. Cl.
*B64D 11/06* (2006.01)

(52) U.S. Cl.
CPC ...... *B64D 11/0601* (2014.12); *B64D 11/0691* (2014.12); *B64D 11/0646* (2014.12)

(58) Field of Classification Search
None
See application file for complete search history.

(56) References Cited

U.S. PATENT DOCUMENTS

| 5,335,963 | A | 8/1994 | Muller et al. |
| 5,769,360 | A | 6/1998 | Kerbis et al. |
| 9,180,970 | B2 | 11/2015 | Ehlers et al. |
| 9,199,740 | B2 | 12/2015 | Ehlers et al. |
| 2014/0138991 | A1* | 5/2014 | Deimen ................. B64D 11/06 297/94 |
| 2014/0339364 | A1* | 11/2014 | Ehlers .................... B64D 11/00 244/118.6 |
| 2016/0340045 | A1* | 11/2016 | Roderwald ........ B64D 11/0606 |

FOREIGN PATENT DOCUMENTS

| EP | 3368417 B1 | 7/2019 |
| JP | S5671638 A | 6/1981 |
| WO | 2017072077 A1 | 5/2017 |

OTHER PUBLICATIONS

Extended Search Report in European Application No. 21215219.3 dated May 9, 2022, 4 pages.

* cited by examiner

*Primary Examiner* — Tien Q Dinh
*Assistant Examiner* — Nevena Aleksic
(74) *Attorney, Agent, or Firm* — Suiter Swantz pc llo

(57) ABSTRACT

Disclosed is an aircraft seat assembly provided as one continuous row generally including at least one passenger seat and a cabin attendant seat positioned at one end of the row, wherein the at least one passenger seat and the cabin attendant seat face in opposite directions. A transverse beam of the passenger seat frame portion of the assembly extends laterally outward to support a coupling assembly attached to the cabin attendant seat. In some cabin layouts, the aircraft seat assembly is positioned adjacent to a lateral passageway extending from a longitudinal aisle to an aircraft door such that the at least one passenger seat faces away from the lateral passageway and the cabin attendant seat faces toward the lateral passageway to position a seated cabin crew member with the passengers and proximate the aircraft door.

12 Claims, 5 Drawing Sheets

AIRCRAFT PASSENGER SEAT ROW WITH CABIN ATTENDANT SEAT

TECHNICAL FIELD

The subject matter disclosed herein relates generally to aircraft seat assemblies, and more particularly to a continuous row of seats including at least one passenger seat and a cabin attendant seat positioned at one end of the row.

BACKGROUND

Modern aircraft cabins are typically configured with separate seating for passengers and cabin crew. Passenger seats are typically arranged in rows positioned along opposing sides of at least one longitudinally extending aisle. Cabin crew seats are typically positioned at the front and/or rear of the passenger seating area.

Passenger and cabin crew seat constructions vary greatly. Passenger seats are revenue generating and are used throughout the duration of a flight, and therefore are designed to maximize both comfort and seating density. Crew seats are not revenue generating and are used only intermittently, primarily during taxi, takeoff and landing of the aircraft, and therefore are designed to minimize their footprint while fulfilling all safety requirements of a crew seat. As such, crew seats are typically mounted to monuments, walls, bulkheads, etc. and include a low-profile backrest and seat bottom that stows between uses of the seat to keep the aisleways free of obstructions.

In some instances, it may be desirable to seat the cabin crew with the passengers, and in particular seat the cabin crew near the aircraft exits. For efficiency in manufacture, it would be desirable to utilize the frame of a passenger seat row to support a crew seat near an exit door. Such a construction would obviate the need for bulkhead mounted seats and structurally reinforced walls for support crew seat loads, as well as reduce weight and manufacturing costs.

Therefore, it would be desirable to provide a cabin crew seat solution that overcomes the aforementioned and other disadvantages associated with wall mounted crew seats.

BRIEF SUMMARY

According to a first aspect, the present disclosure provides an aircraft passenger seat row including a passenger seat frame supporting at least one passenger seat pan and at least one passenger backrest. The passenger seat frame includes spaced frame members delimiting at least one passenger seat position, spaced legs supporting the spaced frame members in an elevated position above the cabin floor, and spaced front and rear transverse beams coupled to the spaced frame members and the spaced legs. The front transverse beam extends continuously from one end of the passenger seat frame to a position laterally outboard beyond an opposing end of the passenger seat frame and the rear transverse beam extends continuously from the one end of the passenger seat frame to the opposing end of the passenger seat frame. A coupling assembly including a first member coupled to the rear transverse beam and receiving the front transverse beam therethrough, and a second member coupled to the front transverse beam, wherein the first and second members are interconnected by an interconnecting member. A cabin attendant seat frame attaches to the coupling assembly and supports a backrest and a pivoting seat pan.

In some embodiments, the first member of the coupling assembly may include an array of spaced openings for receiving the front transverse beam therethrough, each of the spaced openings corresponding to a different, selectable longitudinal alignment position of the coupling assembly with respect to the passenger seat frame.

In some embodiments, the first member of the coupling assembly may include an elongate slot receiving the front transverse beam therethrough, wherein the front transverse beam is selectively positionable along a length of the elongate slot to determine a longitudinal alignment of the coupling assembly with respect to the passenger seat frame.

In some embodiments, the first member of the coupling assembly may be coupled to an outboard side of one of the spaced frame members of the passenger seat frame and/or an outboard side of one of the spaced legs of the passenger seat frame.

In some embodiments, each of the spaced frame members of the passenger seat frame may be a seat spreader supporting a pivoting armrest.

In some embodiments, the cabin attendant seat frame may extend generally vertically and may include an upper portion supporting the backrest and the seat pan, and a lower portion configured to engage the cabin floor.

In some embodiments, the first member of the coupling assembly may be a first plate, the second member of the coupling assembly may be a second plate, and the interconnecting member of the coupling assembly may be attached to each of the first plate and the second plate.

In some embodiments, the passenger seat frame may support two separate passenger seat pans and two separate passenger backrests, and the passenger seat frame may include three spaced frame members delimiting a first passenger seat and a second passenger seat, wherein the first passenger seat is positioned at one end of the aircraft passenger seat row, the cabin attendant seat is positioned at the other end of the passenger seat row, and the second passenger seat is positioned between the first passenger seats and the cabin attendant seat, and wherein the first and second passenger seats face a first direction, and the cabin attendant seat faces a second direction opposite the first direction.

According to another aspect, the present disclosure provides a layout for an aircraft passenger cabin including a longitudinally extending aisle, a plurality of rows of passenger seats positioned in spaced apart relation along one side of the longitudinally extending aisle, and a lateral passageway positioned between two adjacent ones of the plurality of rows of passenger seats, the lateral passageway extending from the longitudinal aisle to an aircraft door, wherein at least one of the two adjacent ones of the plurality of rows of passenger seats is a continuous passenger seat row according to the above.

In some embodiments, the first frame member of the coupling assembly may include a provision for adjustment of the longitudinal positioning of the coupling assembly relative to the passenger seat frame.

In some embodiments, the cabin attendant seat frame extends generally vertically and includes an upper portion supporting the backrest and the seat pan, and a lower portion configured to engage the aircraft cabin floor.

In some embodiments, the passenger seat frame may support two separate passenger seat pans and two separate passenger backrests, and may include three spaced frame members delimiting a first passenger seat and a second passenger seat wherein the first passenger seat is positioned at one end of the aircraft passenger seat row, the cabin attendant seat is positioned at the other end of the passenger seat row, and the second passenger seat is positioned between the first passenger seats and the cabin attendant seat, and wherein the first and second passenger seats face away from the lateral passageway and the cabin attendant seat faces toward the lateral passageway.

In some embodiments, the row of seats may be configured such that the first passenger seat is positioned proximate the aircraft door and the cabin attendant seat is positioned proximate the longitudinally extending aisle.

In some embodiments, the row of seats may be configured such that first passenger seat is positioned proximate the longitudinal aisle and the cabin attendant seat is positioned proximate the aircraft door.

In some embodiments, the front transverse beam may have a length generally corresponding to a width of three passenger seat positions and the rear transverse beam may have a length generally corresponding to a width of two passenger seat positions.

This brief summary is provided solely as an introduction to subject matter that is fully described in the detailed description and illustrated in the drawings. This brief summary should not be considered to describe essential features nor be used to determine the scope of the claims. Moreover, it is to be understood that both the foregoing summary and the following detailed description are exemplary and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, the present disclosure describes an aircraft seat assembly configured as a row of seats including at least one passenger seat and a cabin attendant seat positioned at the end of the row, as well as various aircraft cabin layouts include the seat assembly according to the present disclosure.

Figure 1:
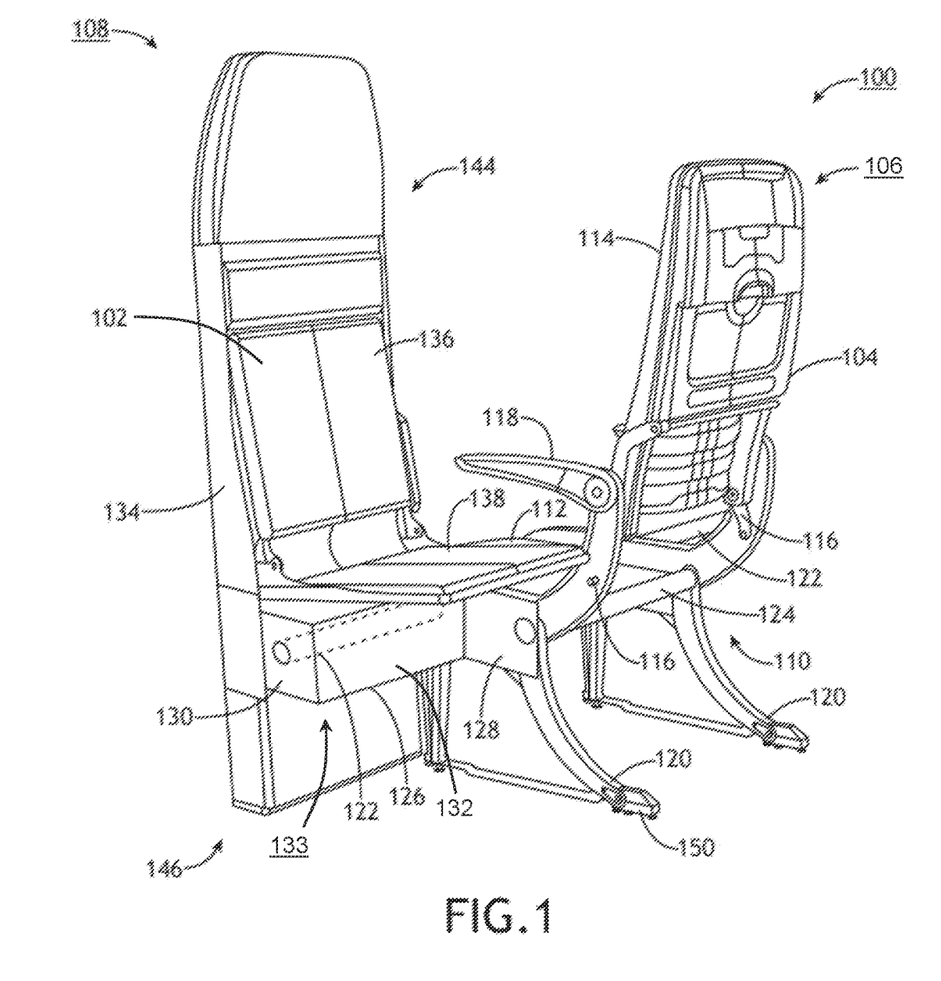
FIG. 1 shows a portion of a passenger seat assembly including at least one passenger seat and a cabin attendant seat positioned at one end of the row in accordance with embodiments of the present disclosure.

With reference to FIG. 1, an aircraft seat assembly according to an exemplary embodiment is shown at 100. The seat assembly 100 is configured as one continuous row of seats adapted to be positioned, for example, in an aircraft passenger cabin. In embodiments, the seat assembly 100 includes a cabin attendant seat (CAS) 102 positioned at one end of a row of passenger seats 104. In some embodiments, the seat assembly 100 includes one passenger seat 104 and the CAS 102. In other embodiments, the seat assembly 100 includes at least two passenger seats 104 and the CAS 102. Whereas three seat rows are common in commercial airliners, a particular embodiment includes two passenger seats 104 and the CAS 102 positioned at one end of the row. CAS as used herein refers to any auxiliary seat type provided in an aircraft or other conveyance typically used by persons other than the passengers and those operating the aircraft/conveyance.

The seat assembly 100 generally includes a passenger seat portion 106 and a CAS portion 108, wherein the two portions are positioned laterally adjacent and the CAS portion 108 is positioned at one end of the row, although the facing directions of the different seat types may vary. The passenger seat portion 106 includes a passenger seat frame 110 supporting at least one passenger seat pan 112 and at least one passenger backrest 114. In some embodiments, at each seat position the seat pan 112 and the backrest 114 may be separate such that the backrest 114 is reclinable relative to the seat pan 112. In other embodiments, the seat pan 112 and the backrest 114 at each seat position may be integrally formed, and may or may not be recline capable.

The passenger seat frame 110 further includes spaced frame members 116 delimiting each passenger seat position. In some embodiments, each frame member is a seat spreader supporting a pivoting armrest 118. Spaced legs 120 support the spaced frame members 116 in an elevated position above the cabin floor. In some embodiments, each leg 120 is equipped with track fasteners 150 for engaging with seat tracks disposed in the cabin floor. In some embodiments, passenger seat portions including a single passenger seat position include two frame members 116 and two legs 120, arranged in sets including one of each and positioned in spaced apart relation. In some embodiments, passenger seat portions including two passenger positions include three frame members 116 and three legs 120, wherein each passenger seat position is delimited between sets each including one frame member 116 and one leg 120.

Front and rear transverse beams 122, 124, or "cross beams," are positioned in spaced apart and parallel relation and are coupled to at least one of the spaced frame members 116 and the spaced legs 120. In some embodiments, each frame member 116 and each leg 120 defines spaced openings therethrough for receiving the respective front and rear transverse beams 122, 124. In other embodiments, one of the frame members 116 and the legs 120 may receive the transverse beams while the other attaches to the transverse beam receiving members. In some embodiments, the transverse beams extend at least from one end of the passenger seat portion 106 to the opposing end of the passenger seat portion 106 such that the transverse beams are common elements across all passenger seat positions.

As shown, each transverse beam 122, 124 is a tubular member having a continuous uninterrupted length. The transverse beams 122, 124 may have a different profile, for example square, and may be solid or tubular. The rear transverse beam 124 extends substantially the length of the passenger seat portion 106. The front transverse beam 122 extends coextensive with the rear transverse beam 124 and continues laterally beyond one end of the passenger seat portion 106 to engage and support a coupling assembly 126 associated with the CAS portion 108, as discussed further below. In some embodiments, the front transverse beam 122 has a length substantially corresponding to the length of a front transverse beam provided in a row of passenger seats not including a CAS. For example, in an aircraft including a plurality of three-seat passenger seat rows, each front transverse beam may have a length substantially corresponding to the length of the three-seat row, and the same transverse beam may be utilized in the construction of the seat assembly according to present disclosure for efficiency in manufacture, with the front transverse beam in the standard row supporting a passenger seat position and the front transverse beam in the seat assembly according to the present disclosure supporting the CAS.

The coupling assembly 126 serves to couple the CAS 102 to the passenger seat frame 110. In some embodiments, the coupling assembly 126 includes a first member 128 coupled to each of the front transverse beam 122 and the rear transverse beam 124, and a second member 130 coupled to the front transverse beam 122. In some embodiments, an interconnecting member 132, or interconnecting assembly, attaches to each of the first frame 128 and the second member 130 to provide stability and support to the assembly. As shown, the first member 128, second member 130 and interconnecting member 132 may form a housing 133 defining an interior for receiving a length of the front transverse beam 122.

The CAS 102 includes a structural frame 134 configured for attachment to the coupling assembly 126. In some embodiments, the structural frame 134 and the coupling assembly 126 may be integrally formed. The CAS 102 includes a backrest 136 coupled to and supported by the structural frame 134. The backrest 136 may be fixed or adjustable in angle. The CAS seat pan 138 may be mounted separate from the backrest 136 to be movable (e.g., pivotable) relative to the structural frame 134 between a stowed condition in which the seat pan 138 is vertical or substantially vertical, and a deployed condition in which the seat pan 138 is horizontal or substantially horizontal (e.g., tilted) to provide an ergonomic sitting position. As used herein, the term "deployed condition" refers to the usable state of the seat pan for sitting (e.g., "open"), the term "stowed condition" refers to the seat pan state when positioned against the backrest (e.g., "closed"). As such, movement toward the deployed conditioned may be referred to as "opening" the seat pan, and movement toward the stowed condition may be referred to as "closing" the seat pan. In some embodiments, the backrest 136 and the seat pan 138 may be coupled such that movement of one drives the movement of the other. In the stowed condition, the area forward of the structural frame 134 and coupling assembly 126 is left open to enlarge the aisleway, as discussed further below.

Figure 2A:
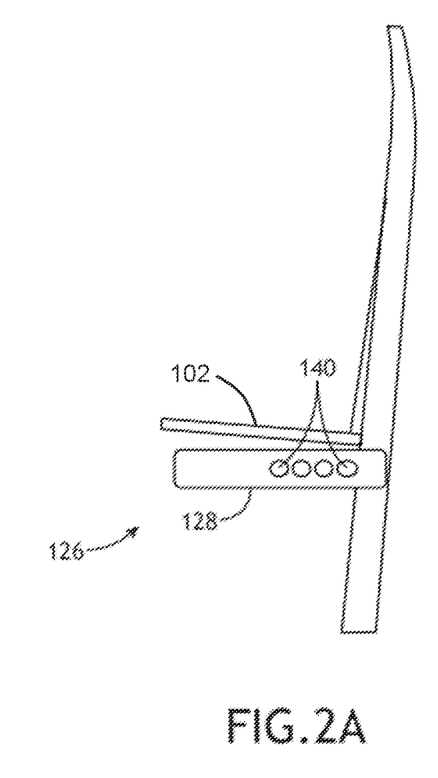
FIG. 2A shows a first embodiment of a coupling assembly including a provision for adjusting a longitudinal position of the cabin attendant seat relative to the passenger seat frame.
Figure 2B:
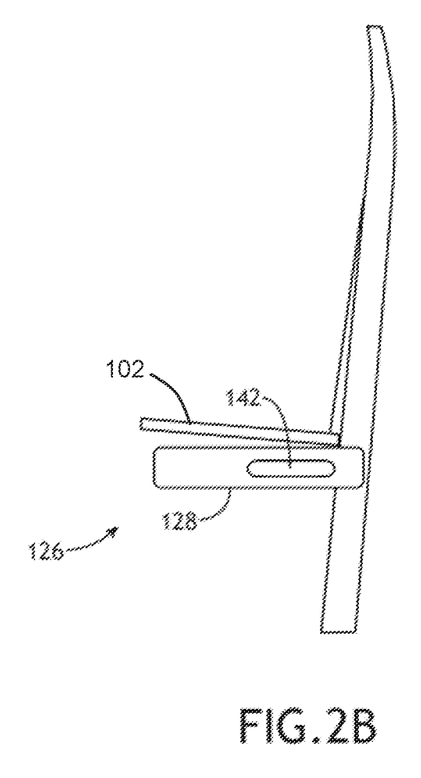
FIG. 2B shows a second embodiment of a coupling assembly including a provision for adjusting a longitudinal position of the cabin attendant seat relative to the passenger seat frame.

With reference to FIG. 2A, a first provision for adjusting the longitudinal position of the coupling assembly 126, and consequently the CAS 102, relative to the passenger seat frame may include an array of spaced openings 140 provided through the first member 128, each opening corresponding to a different longitudinal position. For example, the front transverse beam may be received through a chosen one of the openings 140 and the rear transverse beam may be coupled to the frame member 128, for instance attached through an opening or to the face of the frame member. With reference to FIG. 2B, a second provision for adjusting the longitudinal position of the coupling assembly 126, and consequently the CAS 102, relative to the passenger seat frame may include an elongate slot 142 formed through the frame member 128, wherein the front transverse beam is selectively positionable along the length of the slot 142. Attachments between the frame member 128 and the transverse beams may include, but are not limited to, temporary attachments utilizing fasteners, clevis pins received through openings formed in the beams, etc., or permanent attachments such as welding or integral part forming.

With continued reference to FIG. 1, the structural frame 134 includes an upper portion 144 supporting the backrest 136 and the seat pan 138, and lower portion 146 configured to engage with, and in some embodiments attach to, the aircraft cabin floor. As such, in some embodiments, the CAS 102 is supported by the coupling assembly 126 and by the cabin floor. In a particular embodiment, the first member 128 of the coupling assembly may be a first plate, the second member 130 of the coupling assembly may be a second plate, and the interconnecting member 132 of the coupling assembly may be attached to each of the first and second plates.

The passenger seat(s) 104 and the CAS 102 are arranged such that the passenger seat(s) face a first direction and the CAS 102 faces in a second direction opposite the first direction. In layouts in which the seat assembly 100 is transverse to the longitudinal aircraft axis, the passenger seat(s) 104 may be arranged forward facing and the CAS (102) arranged aft facing, or vice versa.

Figure 3:
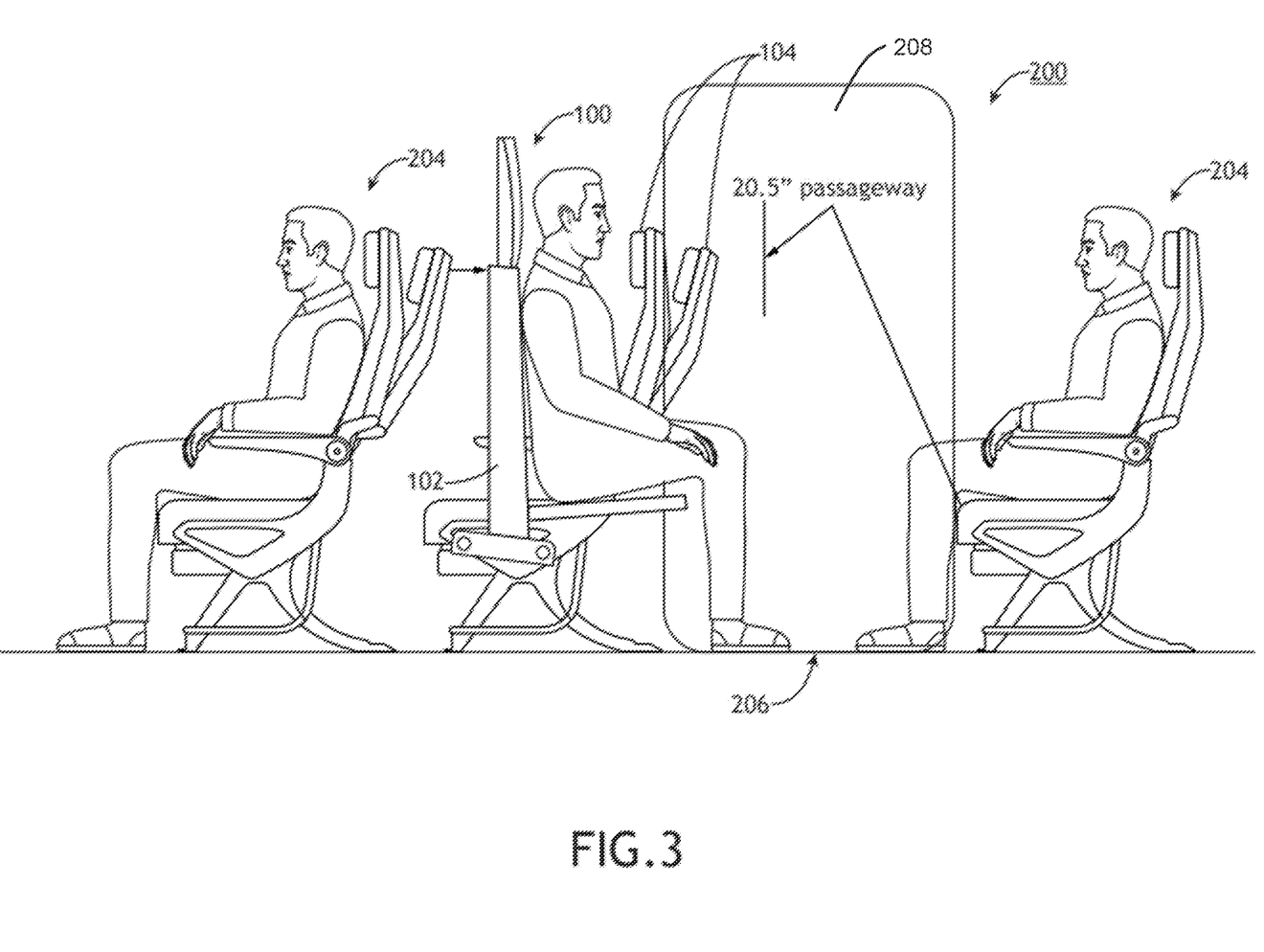
FIG. 3 shows an implementation of the passenger seat assembly in an aircraft cabin near an aircraft door in accordance with an exemplary embodiment of the present disclosure.
Figure 4:
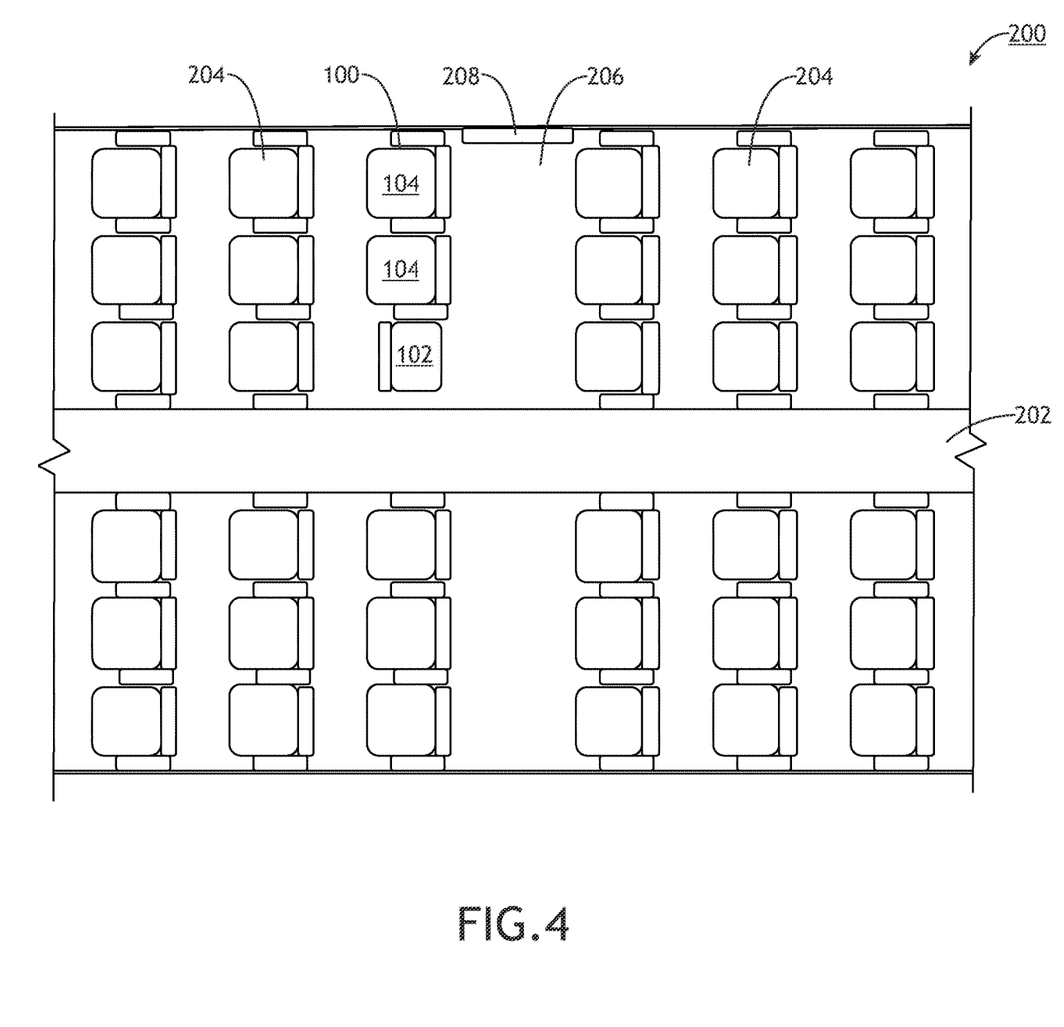
FIG. 4 shows a plan view of an aircraft cabin layout including a passenger seat assembly according to the present disclosure wherein the cabin attendant seat is positioned proximate the longitudinally extending aisle.
Figure 5:
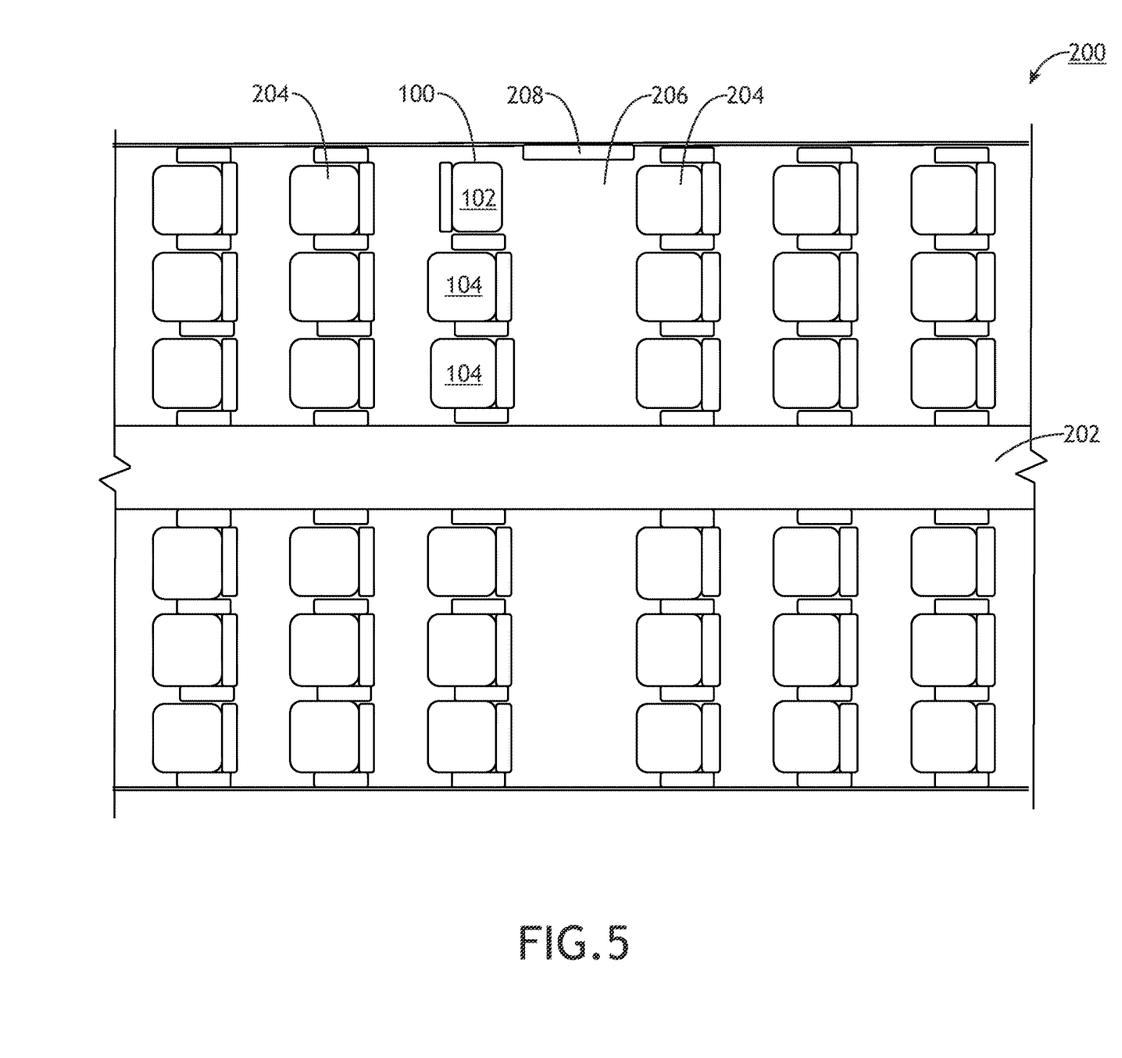
FIG. 5 shows a plan view of an aircraft cabin layout including a passenger seat assembly according to the present disclosure wherein the cabin attendant seat is positioned proximate the aircraft door.

With reference to FIGS. 3-5, different layouts for aircraft passenger cabins 200 are shown in which each layout includes a longitudinally extending aisle 202, a plurality of conventional passenger seat rows 204 positioned in spaced apart relation along at least one side of the longitudinally extending aisle 202, and at least one lateral passageway 206 extending from the longitudinal aisle 202 to an aircraft door 208. In some embodiments, the lateral passageway 206 may be provided between seat rows having a greater seat pitch as compared to the 'standard' seat pitch. In other embodiments, the lateral passageway 206 may be provided between a seat row 204 and a wall. In both configurations, one of the seat rows is the seat assembly 100 according to the present disclosure.

With specific reference to FIG. 3, an alternative configuration of the row-mounted CAS 102 is shown without a lower portion such that the CAS 102 is supported in an elevated position above the cabin floor. As shown, the CAS 102 is arranged as an aisle CAS facing the lateral passageway 206 and the passenger seats 104 in the CAS row are arranged facing away from the lateral passageway 206. This arrangement positions the seated cabin crew member in close proximity to the aircraft door 208. FIG. 4 shows a similar aircraft cabin layout in which the seat row 100 is configured as a three-seat row including forward-facing middle and window passenger seats 104 and an aft-facing CAS seat 102. The CAS 102 is positioned for direct access to each of the longitudinally extending aisle 202 and the lateral passageway 206. FIG. 5 shows an alternative seat assembly configuration in which the row is configured with the CAS 102 as the window seat and the passenger seats 104 as the middle and aisle seats, thereby positioning the seated cabin crew member in closest proximity to the aircraft door 208.

Benefits of the seat assemblies according to present disclosure include utilizing passenger seat row assemblies to support a CAS for efficiency in manufacture, thereby obviating the need for dedicated wall and monument CAS mounting locations, as well as seating the cabin crew with the passengers and near the aircraft exit rows and aircraft doors.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. An aircraft passenger seat row, comprising:
a passenger seat frame supporting at least one passenger seat pan and at least one passenger backrest, the passenger seat frame including spaced frame members delimiting at least one passenger seat position, spaced legs supporting the spaced frame members in an elevated position above a floor, and spaced front and rear transverse beams coupled to the spaced frame members and the spaced legs, wherein the front transverse beam extends continuously from one end of the passenger seat frame to a position laterally outboard beyond an opposing end of the passenger seat frame and the rear transverse beam extends continuously from the one end of the passenger seat frame to the opposing end of the passenger seat frame;
a coupling assembly including a first member coupled to the rear transverse beam and the first member receiving the front transverse beam therethrough, and a second member coupled to the front transverse beam, wherein the second member is interconnected by an interconnecting member; and
a cabin attendant seat frame attached to the coupling assembly, the cabin attendant seat frame supporting a backrest and a pivoting seat pan;
wherein the coupling assembly comprises a provision for adjusting a longitudinal position of the coupling assembly relative to the passenger seat frame, the provision including an array of spaced openings each corresponding to a different selectable longitudinal alignment position of the coupling assembly, or an elongate slot formed in the first member of the coupling assembly wherein the front transverse beam is selectively positionable along a length of the elongate slot.

2. The aircraft passenger seat row according to claim 1, wherein the first member of the coupling assembly is coupled to an outboard side of one of the spaced frame members of the passenger seat frame and/or an outboard side of one of the spaced legs of the passenger seat frame.

3. The aircraft passenger seat row according to claim 1, wherein each of the spaced frame members of the passenger seat frame is a seat spreader supporting a pivoting armrest.

4. The aircraft passenger seat row according to claim 1, wherein the cabin attendant seat frame extends generally vertically and comprises an upper portion supporting the backrest and the seat pan, and a lower portion configured to engage a floor underlying the cabin attendant seat frame.

5. The aircraft passenger seat row according to claim 1, wherein the first member of the coupling assembly is a first plate, the second member of the coupling assembly is a second plate, and the interconnecting member of the coupling assembly is attached to each of the first plate and the second plate.

6. The aircraft passenger seat row according to claim 1, wherein the passenger seat frame supports two separate passenger seat pans and two separate passenger backrests, and wherein the passenger seat frame includes three spaced frame members delimiting a first passenger seat and a second passenger seat, wherein the first passenger seat is positioned at one end of the aircraft passenger seat row, the cabin attendant seat is positioned at the other end of the passenger seat row, and the second passenger seat is positioned between the first passenger seats and the cabin attendant seat, and wherein the first and second passenger seats face a first direction, and the cabin attendant seat faces a second direction opposite the first direction.

7. A layout for an aircraft passenger cabin, comprising:
a longitudinally extending aisle;
a plurality of rows of passenger seats positioned in spaced apart relation along one side of the longitudinally extending aisle; and
a lateral passageway positioned between two adjacent ones of the plurality of rows of passenger seats, the lateral passageway extending from the longitudinal aisle to an aircraft door;
wherein at least one of the two adjacent ones of the plurality of rows of passenger seats is a continuous passenger seat row, comprising:
   a passenger seat frame supporting at least one passenger seat pan and at least one passenger backrest, the passenger seat frame including spaced frame members delimiting at least one passenger seat position, spaced legs supporting the spaced frame members in an elevated position above the aircraft cabin floor, and spaced front and rear transverse beams coupled to the spaced frame members and the spaced legs, wherein the front transverse beam extends continuously from one end of the passenger seat frame to a position laterally outboard beyond an opposing end of the passenger seat frame and the rear transverse beam extends continuously from the one end of the of the passenger seat frame to the opposing end of the passenger seat frame;
   a coupling assembly including a first member coupled to the rear transverse beam and the first member receiving the front transverse beam therethrough, and a second member coupled to the front transverse beam, wherein the second member is interconnected by an interconnecting member; and
   a cabin attendant seat frame attached to the coupling assembly, the cabin attendant seat frame supporting a backrest and a pivoting seat pan;
   wherein the coupling assembly comprises a provision for adjusting a longitudinal position of the coupling assembly relative to the passenger seat frame, the provision including an array of spaced openings each corresponding to a different selectable longitudinal alignment position of the coupling assembly, or an elongate slot formed in the first member of the coupling assembly wherein the front transverse beam is selectively positionable along a length of the elongate slot.

8. The layout for an aircraft passenger cabin according to claim 7, wherein the cabin attendant seat frame extends generally vertically and comprises an upper portion supporting the backrest and the seat pan, and a lower portion configured to engage the aircraft cabin floor.

9. The layout for an aircraft passenger cabin according to claim 7, wherein:
   the passenger seat frame supports two separate passenger seat pans and two separate passenger backrests;
   the passenger seat frame includes three spaced frame members delimiting a first passenger seat and a second passenger seat;
   the first passenger seat is positioned at one end of the aircraft passenger seat row, the cabin attendant seat is positioned at the other end of the passenger seat row, and the second passenger seat is positioned between the first passenger seats and the cabin attendant seat; wherein
   the first and second passenger seats face away from the lateral passageway and the cabin attendant seat faces toward the lateral passageway.

10. The layout for an aircraft passenger cabin according to claim 9, wherein the first passenger seat is positioned proximate the aircraft door and the cabin attendant seat is positioned proximate the longitudinally extending aisle.

11. The layout for an aircraft passenger cabin according to claim 9, wherein the first passenger seat is positioned proximate the longitudinal aisle and the cabin attendant seat is positioned proximate the aircraft door.

12. The layout for an aircraft passenger cabin according to claim 7, wherein the front transverse beam has a length generally corresponding to a width of three passenger seat positions and the rear transverse beam has a length generally corresponding to a width of two passenger seat positions.

* * * * *